3,289,076
LOCATION AND REPAIR OF FAULTS IN ELECTRICAL CONDUCTORS
Edward Alexander Edis, Potters Bar, England, and Robert Vandenbergh Turner, deceased, late of London, England, by Ralph Samuel Turner, administrator, Hastings, England, assignors to A. C. Cossor Limited, London, England, a British company
Continuation of application Ser. No. 69,040, Nov. 14, 1960. This application June 18, 1965, Ser. No. 470,268
Claims priority, application Great Britain, Nov. 24, 1959, 39,910/59
1 Claim. (Cl. 324—67)

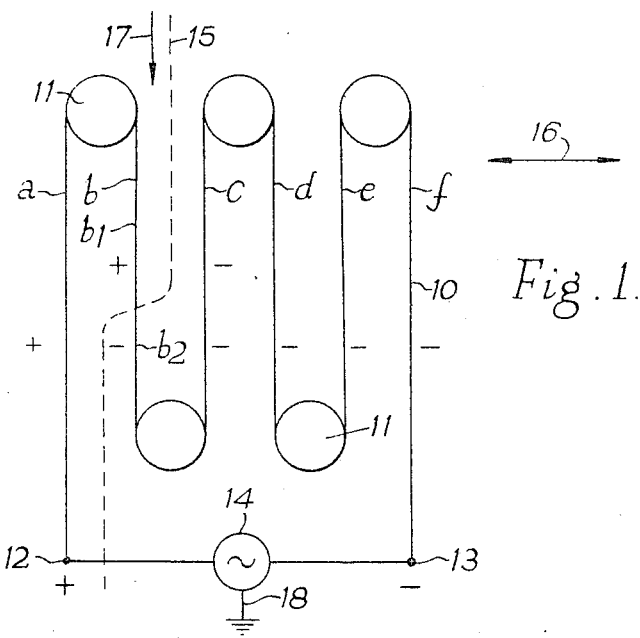
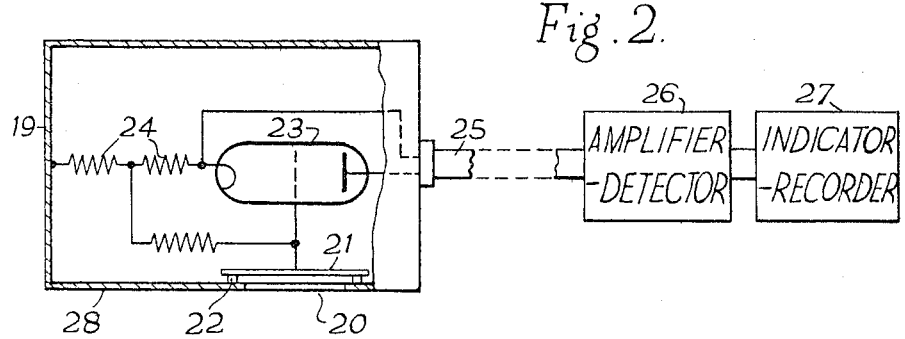
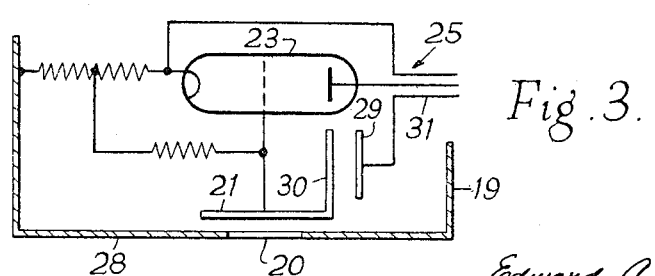

This application is a continuation of copending application Serial No. 69,040 filed November 14, 1960, now abandoned.

The present invention relates to the location and repair of faults in electrical conductors which are buried or otherwise not readily accessible.

An example is a floor-warming resistance element or mat which is enveloped in concrete. The element is usually in the form of a continuous run of cable having a conductor of high resistance. The cable is usually laid upon a concrete base, being passed to and fro between two parallel rows of discs around which the cable is passed. There is thus formed a grid or mat consisting largely of parallel conductors. When the grid has been laid and the necessary electrical connections completed, the floor surface is laid in the form of a screed which completely envelops the cables. In some cases, having regard to the desirability of using a standard cable, more than one grid may be laid, the two or more grids being connected in parallel or series/parallel depending on the resistance per unit length of conductor and the mains voltage value available for feeding the system.

If a break should occur in such an installation after the concrete has set, it is obviously highly desirable to be able to locate the point in the floor at which the break has occurred in order to avoid the need to break up a large area of the surface of the floor.

The present invention is based upon the realization that if a potential difference be applied between the terminals of such a grid and if there be a break at a point in one of the conductors, no current will flow but the parts of the grid on opposite sides of the break will be charged oppositely, the electric field at equal distances from adjacent conductors of the two parts, being the algebraic sum of the fields of the respective conductors, will be zero on one side of the break and other than zero on the other side of the break. Thus if the electric field be explored by means of a capacity probe sensitive to the field, the pattern of the field will change markedly as the probe is moved in a direction parallel to the conductors from one side of the break where the instantaneous polarities are like to the other side of the break where they are unlike.

Similarly if one terminal of a voltage source be connected to one terminal of a grid in which there is a break, the part of the grid on the side of the break nearer the said terminal will assume the potential of the terminal whereas the potential of the remainder of the grid will not vary. The electric field produced in the grid can then be compared with an electric field produced by a probe connected to the other terminal of the voltage source in order to locate the break.

The same considerations apply when the grid is of other than the zig-zag form described, for instance, if it is of spiral form. The invention in certain forms is also applicable where the inaccessible conductor is not in the form of a grid, for instance, where the conductor is straight.

According to the present invention in one aspect, therefore, there is provided a method of locating and repairing a break in an electrical conductor which is not readily accessible, the conductor having its ends connected to accessible terminals and comprising sections extending alongside of one another and so arranged that, when the conductor is continuous, current in the conductor passes through adjacent sections instantaneously in series, the method comprising the steps of applying a potential difference between the terminals, exploring the electric field between the sections to locate a region where there is a rapid change in field strength, obtaining access to the conductor in the said region and repairing the break.

According to the present invention in another aspect there is provided a method of locating and repairing a break in an electrical conductor which is not readily accessible, the conductor having one of its ends connected to an accessible terminal, comprising the steps of applying a potential difference between the said terminal and a member adapted to be moved adjacent the conductor, moving the said member relatively to the conductor to locate a region where there is a rapid change in the resultants of the electric fields of the conductor and the said member, obtaining access to the conductor in the said region and repairing the break.

The potential difference is preferably an alternating potential difference although pulses or even a direct potential difference may be used.

The invention also provides a novel probe suitable for use in carrying out the method of the invention.

The invention will be described, by way of example, with reference to the accompanying drawing in which:

FIG. 1 is a diagrammatic view of one form of conductor grid in which a break can be located by the method of the present invention;

FIG. 2 is a diagrammatical view in part section of one form of probe that can be used in carrying out the method of the invention together with associated circuit elements shown in block form; and FIG. 3 shows in section a part of a modified form of probe.

Referring to FIG. 1, a resistive wire 10 is wound to and fro between discs 11 into the form of a grid composed largely of parallel conductors. The ends of the conductor are connected to terminals 12, 13. It is assumed that the whole of the structure shown in FIG. 1 excepting the terminals 12, 13, is inaccessible, for instance buried in concrete, the terminals 12, 13 being accessible. A break which it is desired to locate is shown between parts $b_1$ and $b_2$ of conductor $b$.

An alternating potential difference is applied between terminals 12 and 13 by means shown at 14. Because of the break no current (other than a negligible charging current) flows in the conductor but the parts of the conductor assume the instantaneous polarities indicated. Thus when the terminal 12 is positive and the terminal 13 negative, the conductor extending from the terminal 12 to the break, namely the parts $a$ and $b_1$, will be charged positively, while the remainder of the grid, including the parts $b_2$, $c$, $d$, $e$ and $f$, will be charged negatively.

Between conductors $a$ and $b_1$ the fields from these positively charged conductors add together. Similarly the fields from the negatively charged conductors $b_2$ and $c$, $c$ and $d$, $d$ and $e$ and $e$ and $f$ add together. Along the broken line 15, however, the fields cancel one another so that this line represents a line of zero field intensity. The line passes midway between conductors $b_1$ and $c$, then passes midway through the break and continues midway between conductors $a$ and $b_2$.

In using the characteristics described in order to locate the break, a capacitive field-detecting probe may be moved in sweeps in the direction 16, that is substantially at right angles to the lengths of the conductor sections, in order to locate points of zero field strength, that is points on the line 15. The probe is moved in a second sweep along the line 15. When in the course of the second sweep, say in the direction 17, the break is traversed, it will be noticeable that the line 15 crosses over from one section between $b_1$ and $c$ to the next adjacent section between $a$ and $b_2$.

If the position of the lines equidistant from the conductors is known, for instance from a record of the installation, only one or two sweeps across the conductors in the direction 16 may be necessary.

On the other hand, if the configuration of the conductor is not known, a further preliminary exploration with the probe may be carried out in order to determine the configuration. When the probe is moved at right angles to the sections, i.e. in the direction 16, in a grid which is not deeply buried, the field-indicating device will give readings which rise and fall, the "troughs" occurring at points equidistant from adjacent sections. In this way, therefore, a plan of the configuration can be made and can conveniently be indicated by chalk marks on the floor.

The frequency of the alternating potential difference applied between the terminals 12, 13 should preferably be adapted to the spacing of the conductor sections. With a grid at a depth of about 2 inches below the surface of a floor and a spacing of sections of about 2 to 3 inches, a frequency of between 1 and 10 kc./s. has been found suitable, the dimensions of the probe in directions parallel to the floor surface being smaller than the spacing. With more closely spaced conductors a higher frequency is desirable in order to enable the dimensions of the probe in relation to the conductor spacing to be reduced.

The potentials applied to the grid terminals are preferably balanced to earth. The earth connection indicated at 18 in FIG. 1 may be actual or virtual in the form of a capacity plate or the like.

A preferred form of probe shown in FIG. 2 comprises a screening box 19 having a window or aperture 20 in one surface thereof. A plate 21 is provided within and insulated from the box by insulators 22 and overlying the edges of the window. The plate 21 is connected to the control grid of a cathode follower 23 arranged within the box, the cathode being connected through a resistor 24 to the box. The output of the cathode follower is connected by means of a cable 25 to an amplifier/detector 26 and thence to an indicator 27 which may be one giving either an audible or a visual indication. The necessary H.T. and L.T. supplies for the cathode follower 23 are fed through the cable 25. A recorder, such as a pen recorder, may be provided at 27 to record the changes in field strength. In use the box 19 is moved over the floor with its surface 28 in contact with the floor surface so that the field to be detected links the plate 21 and the edges of the box around the window 20.

The advantage of the cathode follower is that it is adapted to the high input impedance represented by the capacitance between the plate 21 and the box 19 and it is adapted to provide the low output impedance suitable for use with a substantial length of cable 25 connecting the probe to the indicating instrument. The high input impedance provides for a high energy transfer from the electric field to the probe and the low output impedance avoids unnecessary loss of signal strength in the cable coupling.

It has been found that with a grid of the dimensions given above, the present invention enables the position of a break to be determined to within a circle of 3 inches diameter or less. It is, therefore, necessary to break up only a very small area of the floor surface in order to obtain access to the break and repair it.

The method described can be used most easily when the break is remote from the boundaries of the grid. Another method which, although applicable wherever the break may be, is particularly useful when the break is near a boundary of the grid will now be described with reference to FIG. 3.

The probe shown in FIG. 3 is of the construction already described with reference to FIG. 2 but provided with means for applying the potential from one terminal of a high frequency source to the plate 21. The potential may be applied through a conductor 31 in the cable 25 and through a capacitor which may, as shown, be constituted by a further plate 29 arranged parallel to and spaced from an extension 30 of the first-named plate. The extension may, as shown, for compactness, be bent at right angles to the remainder of the plate 21. The other terminal of the source is connected to one terminal of the grid or mat to be tested.

When such a probe is moved over a floor in which the grid or other form of conductor is buried, the electric field of the buried conductor on the side of a break which is connected to the source is in opposite sense to the field of the probe. When, however, the probe is adjacent the conductor on the opposite side of the break there will be no electric field in opposition to that of the probe. In this case the zero potential line is in a vertical plane passing through the part of the conductor which is connected to the source. The probe of FIG. 3 may be connected to an amplifier/detector and indicator/recorder as shown in FIG. 2.

From the foregoing it will be understood that the embedded conductor 10 is arranged in the form of a grid in which linear sections of the conductor (sections $a$ to $f$, inclusive) are arranged in spaced parallel relation and are connected in series circuit relation between exposed terminals 12 and 13. Each pair of adjacent conductor sections form one section of the grid. For example, the grid illustrated in FIGURE 1 is formed of five grid sections made up of conductor section pairs $a$–$b$, $b$–$c$, $c$–$d$, $d$–$e$, and $e$–$f$, respectively.

As explained above, when a break occurs in one of the conductor sections, for example, at the point X in the conductor section $b$, all conductor parts which are directly connected to the terminal 12 will be of the same instantaneous potential (positive in the selected example) while all of the conductor parts on the other side of the break and connected to the terminal 13 will be of the same instantaneous potential as terminal 13 but of opposite polarity with respect to the potential of the parts connected to terminal 12, as shown by the negative marking in FIG. 1.

The electric fields which will exist in or above the grid sections will depend upon the polarities of the two conductor sections which define a particular grid section. For example, the field formed between conductors $c$ and $d$ will be a negative field caused by the joint action of the negative potentials applied to these conductor sections, and the field formed in the grid section $d$–$e$ will be the added effect of the negative potentials applied to conductor sections $d$ and $e$, and likewise for the grid section $e$–$f$. Thus, if the grid sections $c$–$d$, $d$–$e$, and $e$–$f$ are traversed by a field detector in the direction of the arrow 16, it will found that the field established within each of these grid sections will have a maximum value along a path mid-way between the two conductor sections forming a section of the grid.

In the grid section which is formed between the conductor section $c$ and the conductor section $b$ which includes the break at the point X, the part $b_1$ of conductor section $b$ is at a positive instantaneous potential at the same time the conductor $c$ is at a negative potential, and the field established along the center line of the section $b$–$c$ will be zero down to the break X. Below the point of the break X, the field at the middle of grid section $b$–$c$ will be of maximum negative value produced by the added effects of the negative potentials applied to the conductor section $c$ and to part $b_2$ of conductor section $b$.

In the grid section formed between conductors $a$ and $b$, the field formed at the middle of this section above the break X will be the added effects of the positive potentials applied to conductor section $a$ and to the part $b_1$ of conductor section $b$. Below the point X the field established between the conductor sections $a$ and $b$ will be zero, due to the fact that the positive potential on conductor section $a$ will neutralize the field of the negative potential on the part $b_2$ of conductor section $b$.

Thus, when the field paths are explored over the area of the grid, it will be found that the path of zero field, represented by dotted line 15, will shift from grid section $b_1-c$ to section $a-b_2$ as the detector moves across the point of break X when moving in the direction of arrow 17.

We claim:

A method of locating a break in an electric conductor which is not readily accessible, the conductor having its ends connected to first and second accessible terminals and being formed as a grid in which linear sections of the conductor are arranged in spaced parallel relation and, in the absence of a break, are connected in conductive series circuit relation between said accessible terminals, whereby when a potential difference is applied between said terminals, current will flow through all of said conductor sections simultaneously, each pair of adjacent conductor sections forming one section of the grid and producing an electric field between said adjacent conductor sections in dependence upon the potentials at which said adjacent conductor sections are maintained, the field created in each grid section along a path midway between said adjacent conductor sections having a maximum value when the two conductor sections thereof are maintained at potentials of the same polarity and being of zero value when the two conductor sections thereof are maintained at potentials of opposite polarity, said method comprising the steps of applying fluctuating potentials of opposite instantaneous polarities to said first and second terminals, whereby when a break of said conductor appears in one of said conductor sections, all of the conductor sections on one side of said break assume the potential of said first terminal to which they are connected, and all of the conductor sections on the opposite side of said break assume the potential of said second terminal which is of opposite polarity with respect to said first terminal, whereby one grid section located on one side of the conductor section containing said break will have a linear section thereof located on one side of said break in which the electric field is of zero value, and the grid section on the opposite side of said conductor section containing said break will have a linear section thereof on the opposite side of said break in which the electric field is of zero value, moving said detector across said grid to determine the location and direction of the field paths established by the grid sections and the two grid sections having zero field value, and thereby locating the position of the conductor section containing said break and exploring the electric field in said two grid sections containing portions having zero electric field by moving said field detector along the length of said grid sections and determining the point at which the condition of zero electric field shifts from one grid section to the adjacent grid section.

References Cited by the Examiner

UNITED STATES PATENTS

| | | | |
|---|---|---|---|
| 1,745,419 | 2/1930 | Henneberger | 324—52 X |
| 2,698,921 | 1/1955 | Wharton | 324—52 |
| 2,731,598 | 1/1956 | Herbert | 324—52 |
| 3,155,897 | 11/1964 | Rice | 324—52 |

WALTER L. CARLSON, *Primary Examiner.*

G. R. STRECKER, *Assistant Examiner.*